United States Patent
Nikitin et al.

(10) Patent No.: US 6,608,294 B2
(45) Date of Patent: Aug. 19, 2003

(54) SIMPLE METHOD OF PRECISION CALIBRATION OF MAGNIFICATION OF A SCANNING MICROSCOPES WITH THE USE OF TEST DIFFRACTION GRATING

(75) Inventors: Arkady Nikitin, Ardsley, NY (US); Dmitriy Yeremin, Dobbs Ferry, NY (US)

(73) Assignee: General Phosphorix, LLC, Ardsley, NY (US)

( * ) Notice: Subject to any disclaimer, the term of this patent is extended or adjusted under 35 U.S.C. 154(b) by 94 days.

(21) Appl. No.: 09/945,431

(22) Filed: Sep. 4, 2001

(65) Prior Publication Data

US 2003/0071191 A1 Apr. 17, 2003

(51) Int. Cl.$^7$ ................................. G02B 7/04

(52) U.S. Cl. ............... 250/201.3; 702/85; 359/368

(58) Field of Search ............ 250/201.3, 201.4, 250/201.5, 201.6, 201.7; 702/85; 359/368

(56) References Cited

U.S. PATENT DOCUMENTS 6,355,919 B1 * 3/2002 Engelhardt ............... 250/201.3

* cited by examiner

Primary Examiner—Walter E. Snow
(74) Attorney, Agent, or Firm—I. Zborovsky

(57) ABSTRACT

A method of precision calibration of magnification of scanning microscopes with the use of a test diffraction grating includes positioning and orientation of a test object on a stage of microscope so that strips of a test diffraction grating are perpendicular to a direction along which a calibration is performed, scanning of a selected portion of the test object along axes X and Y, measuring values of a signal S versus on coordinates x and y in a plane of scanning and storing of the values S (x, y) in a digital form as a two-dimensional digital array, transforming the two-dimensional array of signals S(x, y) into a two-dimensional array S (u, v) by turning of the axes so that a direction of a new axis u is perpendicular to the strips of the grating and a direction of a new axis v coincides with the strips of the grating, line-by-line mathematical processing of the array S(u) including for each line approximating of an array of discrete values S(u, v) with a periodical analytical function determining a pitch of an analytical function, and calculating a magnification in accordance with the selected direction.

5 Claims, 3 Drawing Sheets

Image of a test object.
1- field of view; 2- pixels; 3- strips of the test diffraction grating; u- direction in which magnification of a microscope is to be determined

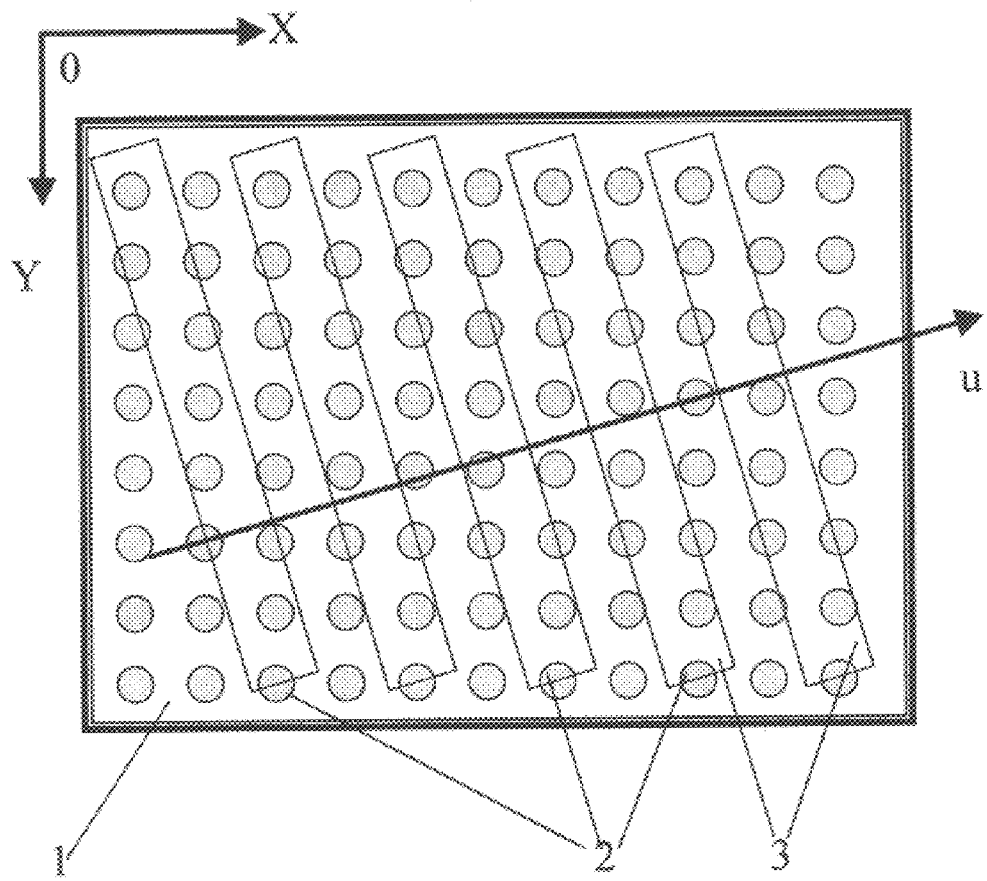
Figure 1. Image of a test object.
1- field of view; 2- pixels; 3- strips of the test diffraction grating; u- direction in which magnification of a microscope is to be determined

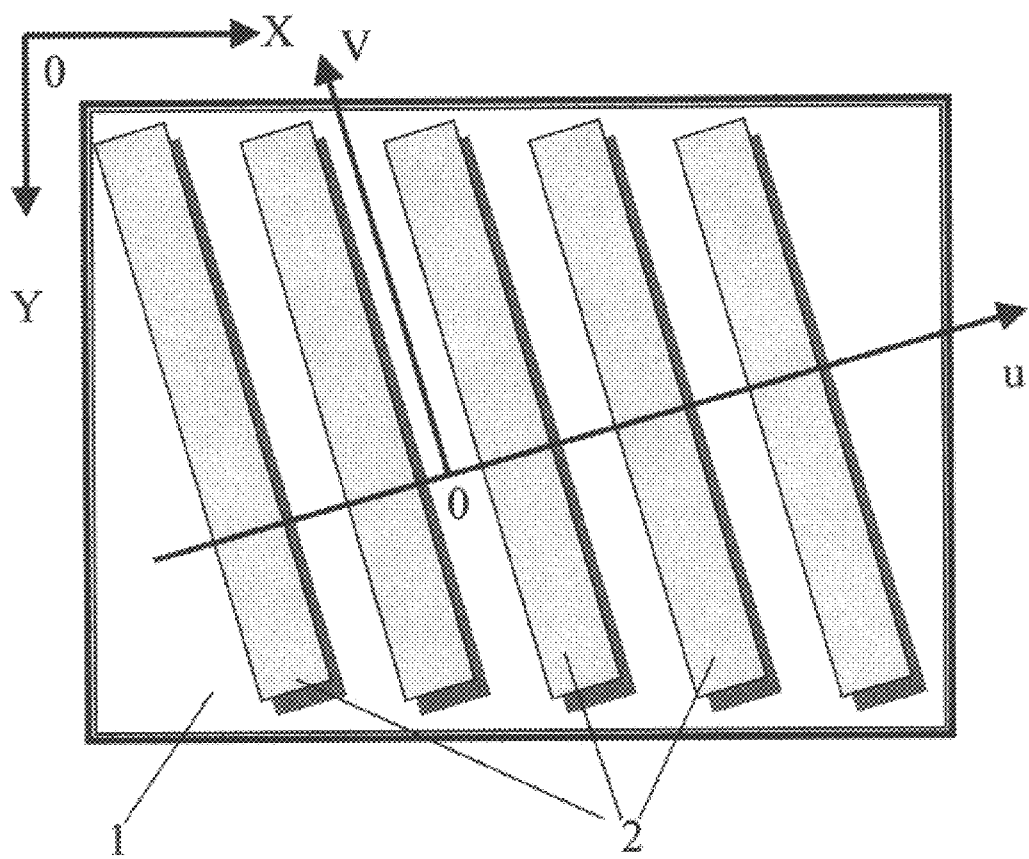
Figure 2. Initial and new coordinate systems.
1- microscope field of view; 2- strips of test diffraction grating

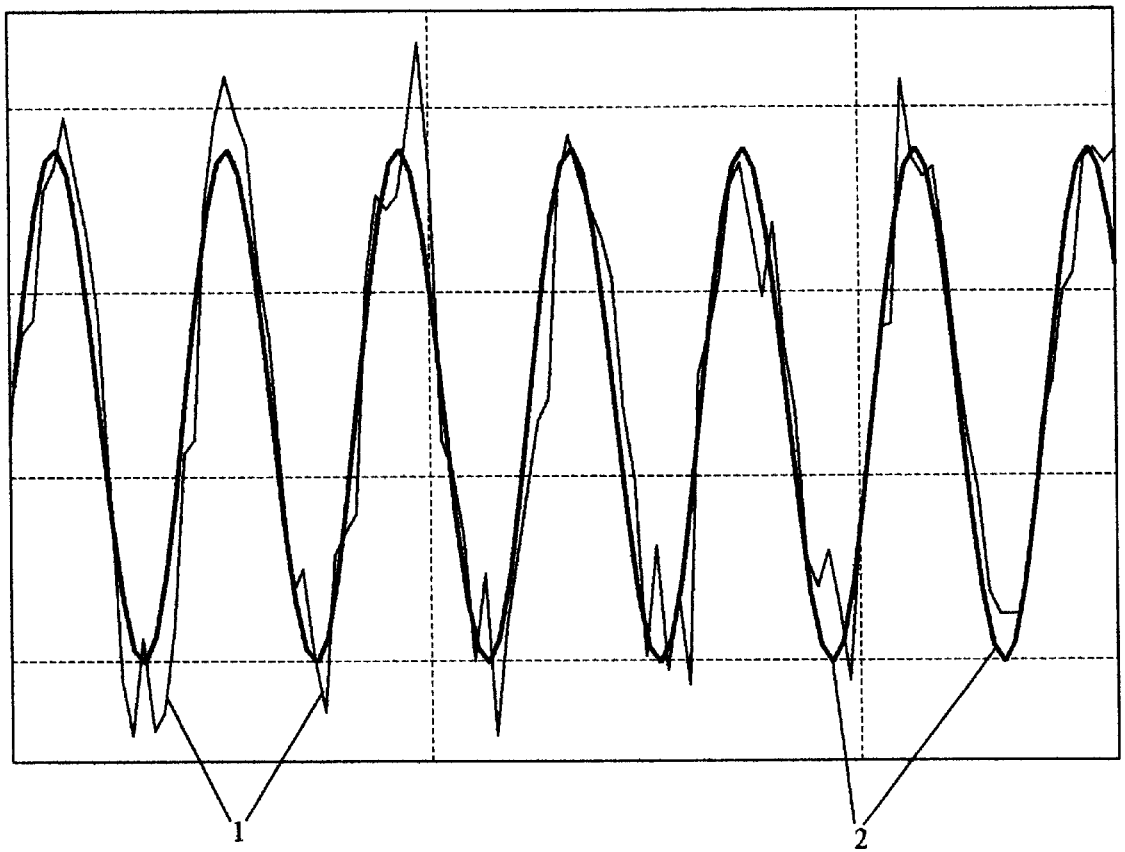
Figure 3. Superposition of the one line of SEM video-signal (1) and approximating analytical function (2)

SIMPLE METHOD OF PRECISION CALIBRATION OF MAGNIFICATION OF A SCANNING MICROSCOPES WITH THE USE OF TEST DIFFRACTION GRATING

BACKGROUND OF THE INVENTION

The present invention relates to a method of precision calibration of magnification of a scanning microscopes with the use of test diffraction grating.

Methods of precision calibration of a magnification of scanning microscopes with the use of test diffraction gratings are known. In the existing methods a test object is positioned and oriented on a microscope stage, and corresponding part of the test objects is scanned, with subsequent processing of the thusly obtained data. It is believed that the existing methods can be further improved.

SUMMARY OF THE INVENTION

Accordingly, it is an object of the present invention to provide method of precision calibration of magnification of a scanning microscopes with the use of test diffraction grating.

In keeping with these objects and with others which will become apparent hereinafter, one feature of present invention resides, briefly stated, in a method of precision calibration of magnification of scanning microscopes with the use of a test diffraction grating, comprising the steps of positioning and orientation of a test object on a stage of microscope so that strips of a test diffraction grating are perpendicular to a direction along which a calibration is performed; scanning of a selected portion of the test object along axes X and Y; measuring values of a signal S versus coordinates x and y in a plane of scanning and storing of said values S (x, y) in a digital form as a two-dimensional digital array; transforming the two-dimensional array of signals S(x, y) into a two-dimensional array S (u, v) by turning of the axes so that a direction of a new axis u is perpendicular to the strips of the grating and a direction of a new axis v coincides with the strips of the grating; line-by-line mathematical processing of the array S (u, v) including for each line S(u) approximating of an array of discrete values S (u) with a periodical analytical function $$Y(x) = A^* \sin(B^* x - c) + D$$

wherein A, B, C, D are the empiric constants whose values are selected in accordance with a best correspondence between an analytical curve and the array of S(u), and determining a pitch $T_v$ of the analytical function Y(x) in accordance with a formula:

$$T_v = 2^* \pi / B,$$

wherein $T_v$ is a value of the pitch in pixels, B is a value of the empirical constant B obtained in a previous step and corresponding to a best approximation of the array S(u) to the analytical function; transferring to a next line S(u) with a new coordinate v and performing the same processing: approximation, pitch determination; performing standard statistical processing of sets of values $T_v$ corresponding to various lines v by calculating of an average value of the pitch T for all lines; and calculating a magnification $M_u$ in accordance with the selected direction u in correspondence with the formula:

$$M_U = \frac{T \cdot L}{T_0 \cdot N}$$

wherein L is a width of a medium of the image in a direction of calibration, $T_o$ is an independently attested value of a pitch of the test object in absolute units, N is a number of pixels in the line along the direction u.

When the method is performed in accordance with the present invention, the method is simpler which requires less expense for corresponding programming and it is more accurate than the existing methods.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing an image of a test object with directions of scanning and a direction in which magnification of a microscope is to be determined;

FIG. 2 is a view additionally illustrating a second coordinate system, in which an obtained array of signals is to be converted; and FIG. 3 is a view showing a signal for one line of scanning, and an approximating analytical function which approximates the signal.

DESCRIPTION OF THE PREFERRED EMBODIMENTS

In accordance with the present invention a method for precision calibration of a magnification of a scanning microscope is performed with a test diffraction grating. FIG. 1 shows a field of view 1 of a scanning microscope with a plurality of pixels 2 of a signal of scanning with an image of a diffraction grating. The directions of scanning are identified with X and Y and the scanning is performed in accordance with these two perpendicular axes. A magnification calibration of the scanning electron microscope is performed in direction u. As can be seen from this drawing, the test object is positioned and oriented on the microscope stage so that the strips of the test diffraction grating are perpendicular to the direction u of calibration.

A portion of the test object which is shown in FIG. 1 is then scanned, and a plurality of values of the signal S versus coordinates x and y in a plane of scanning are obtained. These values is identified as S(x, y) and they are stored in a digital form as a two-dimensional digital array, for example in a memory of a computer. The thusly obtained two dimensional array of signal S(x, y) is transformed into a two dimensional array S(u, v) by turning of the axes, so that a direction of a new axis u is perpendicular to the strips of the grating, and a direction of a new axis v corresponds to the direction of the strips of the grating, as shown in FIG. 2. Thereby a new array of the signal is obtained.

After this a mathematical processing of new array S(u,v) is performed for each line of the new array. The mathematical processing includes first of all an approximation of the values S(u) with the periodical analytical function Y(x)=Asin(Bx−C)+D. For example it can be performed with the use of a method of least squares. This processing is performed in the computer. Then a pitch determination $T_v$ of the analytical function Y(x) for each line with a number v is performed. The determination can be performed in accordance with the formula $T_v = 2\pi/B$. In this formula $T_v$ is a value of a pitch in pixels, B is empirical constant obtained in the previous step and corresponding to a best approximation of the array S(u) by the analytical function.

The same analytical processing is performed for each subsequent line, starting from a next line S(u) with a new value of the coordinate v, with the same above mentioned steps.

Then a standard statistical processing of the sets of values $T_v$ corresponding to various lines v is performed, by a calculating of an average value of the pitch T for all lines. Then a magnification $M_u$ in the above mentioned direction u is performed in accordance with the formula $$M_U = \frac{T \cdot L}{T_0 \cdot N},$$

wherein L is a width of a medium of the image in a direction of calibration, $T_o$ is an independently attested value of a pitch in absolute values of the test object, N is a number of pixels on a line along the direction u.

In accordance with the present invention, a noise suppression is performed before the line-by-line mathematical processing, for example by averaging, smoothing, etc.

Also, before the approximation step, an operation of convoluting of the array S(u) with an auxiliary even integratable function is performed. The convoluting preparation can be procedure with the use of a Gauss function $$Y(x) = E \cdot exp[-x^2/F^2],$$

wherein E and F are constants.

It will be understood that each of the elements described above, or two or more together, may also find a useful application in other types of methods and constructions differing from the types described above.

While the invention has been illustrated and described as embodied in method of precision calibration of magnification of a scanning microscopes with the use of test diffraction grating, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of precision calibration of magnification of scanning microscopes with the use of a test diffraction grating, comprising the steps of positioning and orientation of a test object on a stage of microscope so that strips of a test diffraction grating are perpendicular to a direction along which a calibration is performed; scanning of a selected portion of the test object along axes X and Y; measuring values of a signal S versus coordinates x and y in a plane of scanning and storing of said values S (x, y) in a digital form as a two-dimensional digital array; transforming the two-dimensional array of signals S(x, y) into a two-dimensional array S (u, v) by turning of the axes so that a direction of a new axis u is perpendicular to the strips of the grating and a direction of a new axis v coincides with the strips of the grating; line-by-line mathematical processing of the array S (u, v) including for each line S(u) approximating of an array of discrete values S (u, v) with a periodical analytical function $$y(x) = A \cdot sin(B^*x - c) + D,$$

wherein A, B, C, D are empiric constants whose values are selected in accordance with a best correspondence between an analytical curve and the one dimensional array of S(u), determining a pitch T of the analytical function Y(x) for a line v in accordance with a formula:

$$T_v = 2^*\pi/B,$$

wherein T is a value of the pitch in pixels, B is a value of the empirical constant B obtained in a previous step and corresponding to a best approximation of the array S(u) to the analytical function; performing standard statistical processing of sets of values $T_v$ corresponding to various lines v by calculating of an average value of the pitch T for all lines; and calculating a magnification Mu in accordance with the selected direction u in correspondence with the formula:

$$M_U = \frac{T \cdot L}{T_0 \cdot N},$$

wherein L is a width of a medium of the image in a direction of calibration, $T_o$ is an independently attested value of a pitch of the test object in absolute units, N is a number of pixels on a line along the direction u.

2. A method as defined in claim 1; and further comprising selecting of the empiric constants in accordance with the method of least squares.

3. A method as defined in claim 1; and further comprising performing a noise suppression before said line-by-line processing of the array S(u, v).

4. A method as defined in claim 1; and further comprising convoluting the array S(u) with an auxiliary even integrable function, before said approximating of array of discrete values S(u).

5. A method as defined in claim 4, wherein said convoluting includes convoluting with a Gauss function $$Y(x) = E exp[-x^2/F^2],$$

wherein E and F are constants.

* * * * *